United States Patent Office 2,996,502
Patented Aug. 15, 1961

2,996,502
6β - METHYL - PREGNANE - 3β,5α,17α - TRIOL-20-ONE AND METHOD FOR PREPARATION THEREOF
Pietro de Ruggieri and Carlo Ferrari, Milan, Italy, assignors to Ormonoterapia Richter S.p.A., Milan, Italy
No Drawing. Filed Sept. 29, 1958, Ser. No. 763,799
6 Claims. (Cl. 260—239.55)

The present invention relates to the preparation of compounds represented by the following formula

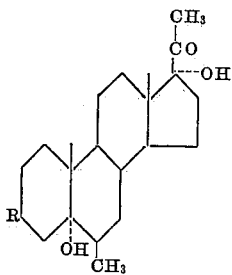

wherein R is OH or =O, which are useful intermediates for preparing compounds of high biological activity in the field of progestative and cortical hormones.

As starting materials compounds represented by the following formula have been selected

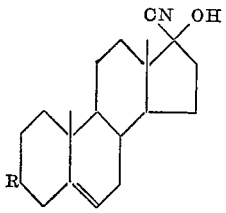

wherein R is an acetoxy group in β position or an ethylene glycol ketal.

The 3β - acetoxy - androst - 5 - ene - 17β - cyano-17α-ol (A. Butenandt and J. Schmidt-Thomè, Ber. 71, 1487; 1938) and the 3-ethylenedioxy-androst-5-ene-17β-cyano-17α-ol (A. Ercoli and P. de Ruggieri, J. Am. Chem. Soc. 75, 650; 1953) was epoxidated with perbenzoic acid or monoperphthalic acid to yield a mixture of α and β-oxides separated by crystallization. The 3β - acetoxy - 5α,6α - oxide - androstane - 17β - cyano-17α-ol, and 3-ethylenedioxy - 5α,6α - oxide - androstane-17β-cyano-17-ol, when treated with 2,3-dihydropyran in presence of catalytic amounts of phosphorus oxychloride or p-toluenesulfonic acid afford the 3β-acetoxy-5α,6α-oxide - androstane - 17β - cyano - 17α - (2' - tetrahydropyranyloxy) and 3 - ethylenedioxy - 5α,6α - oxide - androstane - 17β - cyano - 17α - (2' - tetrahydropyranyloxy).

These tetrahydropyranylethers are oriented in 17α position and are completely stable towards Grignard's reagents instead of the free 17 hydroxy compounds; therefore, when treated with methyl magnesium bromide or iodide, they afford after decomposition of the 20-ketimines and at the same time of the ethylenedioxy group the 6β - methyl - pregnane - 3β,5α,17α - triol - 20 - one and the 6β-methyl-pregnane-5α,17α-diol-3,20-dione.

The following examples are given to further illustrate the products and process of the present invention and are not be construed as limiting.

Example 1.—3β - acetoxy - 5α,6α - oxide - androstane-17β-cyano-17α-ol

A solution of 1.0 part of 3β-acetoxy-androst-5-ene-17β-cyano-17α-ol in 10 parts of chloroform was treated with 1.0 part of perbenzoic acid dissolved in 10 parts of ethyl acetate for 5.5 days at room temperature. After dilution with water, the organic layer was washed with a 2 N aqueous solution of sodium carbonate, followed by water, dried over Na₂SO₄ and concentrated in vacuo to dryness. After crystallization from ether the α-oxide was separated at M.P. 178–182° C. dec.

Example 2.—3 - ethylenedioxy - 5α,6α - oxide - androstane-17β-cyano-17α-ol

A solution of 1.0 part of 3-ethylenedioxy-androst-5-ene-17β-cyano-17α-ol in 20 parts of chloroform was treated with 13 parts of a ethereal solution of 0.7 part of monoperphthalic acid for 24 hours at 0–5° C. The phthalic acid precipitated was filtered off from the mixture, and washed with chloroform; the organic layer was washed with 2 N aqueous solution of sodium carbonate followed by water, dried over Na₂SO₄, and concentrated in vacuo to dryness. After crystallization of the residue from ether the α-oxide was separated at M.P. 186–188° C. dec.

Example 3.—3β - acetoxy - 5α,6α - oxide - androstane-17β-cyano-17α-(2'-tetrahydropyranyloxy)

A solution of 1.0 part of 3β-acetoxy-5α,6α-oxide-androstane-17-cyano-17-ol in 4.0 parts of 2,3-dihydropyran was treated at room temperature for 4 hours with 0.05 part of phosphorus oxychloride. The solution was then diluted with ether, washed with 2 N aqueous solution of sodium carbonate followed by water, dried over sodium sulphate and distilled at reduced pressure. The residue was crystallized from ether to yield the 3β-acetoxy-5α,6α - oxide - androstane - 17β - cyano - 17α - (2' - tetrahydropyranyloxy). M.P. 183–186° C. dec.

Example 4.—3 - ethylenedioxy - 5α,6α - oxide - androstane-17β-cyano-17α-(2'-tetrahydropyranyloxy)

A solution of 1.0 part of 3-ethylenedioxy-5α,6α-oxide-androstane-17-cyano-17-ol in 4.0 parts of 2,3-dihydropyran was treated at room temperature for 4 hours with 0.05 part of p-toluenesulfonic acid. The solution was then diluted with ether, washed with 2 N aqueous sodium carbonate followed by water, dried over Na₂SO₄ and distilled at reduced pressure. Several crystallizations from ether-petroleum ether afford the 3-ethylenedioxy-5α,6α-oxide - androstane - 17β - cyano - 17α - (2' - tetrahydropyranyloxy), M.P. 177–179° C. dec.

Example 5.—6β - methyl - pregnane - 3β,5 ,17α - triol-20-one

A solution of 1.0 part of 3β-acetoxy-5α,6α-oxide-androstane - 17β - cyano - 17α - (2' - tetrahydropyranyloxy) in 30 parts of anysol was treated with 50 parts of ethereal solution of methyl magnesium iodide (from 3.3 parts of magnesium). The ether was removed and the mixture kept at 90–95° C. for 16 hours. After decomposition with 100 parts of acetic acid and 80 parts of water, the mixture was refluxed for 15 minutes and the solvent was removed by steam distillation. The aqueous suspension was filtered and crystallized from acetone to give the 6β-methyl-pregnane-3β,5α,17α-triol-20-one, M.P. 245–249° C.

Example 6.—6β - methyl - pregnane - 5α,17α - diol - 3,20-dione

A solution of 1.0 part of 3-ethylenedioxy-5α,6α-oxide-androstane - 17β - cyano - 17α - (2' - tetrahydropyranyloxy) in 40 parts of anysol was treated with 50 parts of ethereal solution of methyl magnesium bromide (from 3 parts of magnesium). The ether was removed and the mixture kept at 90–95° C. for 16 hours. After decomposition with 70 parts of ice-cooled sulfuric acid 2 N, the mixture was refluxed for 15 minutes, the organic layer separated, and the aqueous-phase was extracted with ether.

The combined organic extracts were washed with water and distilled by steam; after filtration of the product, crystallization was accomplished from acetone to yield 6β-methyl - pregnane - 5α,17α- diol - 3,20 - dione, M.P. 270–273° C. already known.

We claim:

1. A method for the preparation of compounds having the following formula

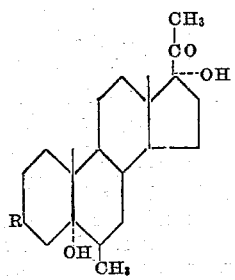

wherein R is a member selected from the group consist- of OH and =O which comprises reacting a member selected from the group consisting of 3β-acetoxy-androst-5 - ene - 17β - cyano - 17α - ol and 3 - ethylenedioxy-androst - 5 - ene - 17β - cyano - 17α - ol with a peracid selected from the group consisting of monoperphthalic acid and perbenzoic acid, treating the resulting α-oxide-cyanohydrins with 2,3-dihydropyran in the presence of a catalyst selected from the group consisting of phosphorus oxychloride and p-toluenesulfonic acid, treating the tetrahydropyranylethers with a methyl magnesium halide selected from the group consisting of bromide and iodide and finally decomposing with an acid selected from the group consisting of sulfuric acid and acetic acid the 20-ketimines and at the same time the ethylenedioxy group.

2. The 3β - acetoxy - 5α,6α - oxide - androstane - 17β-cyano-17α-ol.

3. The 3 - ethylenedioxy - 5α,6α - oxide -androstane-17β-cyano-17α-ol.

4. The 3β - acetoxy - 5α,6α - oxide - androstane - 17β-cyano-17α-(2'-tetrahydropyranyloxy).

5. The 3 - ethylenedioxy - 5α,6α - oxide - androstane-17β-cyano-17α-(2'-tetrahydropyranyloxy).

6. The 6β - methyl - pregnane - 3β,5α,17α - triol - 20-one.

References Cited in the file of this patent

UNITED STATES PATENTS

| | | |
|---|---|---|
| 2,136,401 | Strassberger | Nov. 15, 1938 |
| 2,326,756 | Butenandt | Aug. 17, 1943 |
| 2,763,671 | Fried et al. | Sept. 18, 1956 |
| 2,842,572 | Herr et al. | July 8, 1958 |
| 2,873,273 | De Ruggieri et al. | Feb. 10, 1959 |

OTHER REFERENCES

Madaeva et al.: Zhurnal Obschei Khimii, vol. 10, No. 3, pages 213–16 (1940).

Fieser and Fieser: "Natural Products Related to Phenanthrene," pages 375, 386, 393 (1949).

Babcock et al.: J.A.C.S., vol. 80, pages 2904–5 (June 5, 1958).